(12) United States Patent
Furuya et al.

(10) Patent No.: US 10,055,173 B2
(45) Date of Patent: Aug. 21, 2018

(54) IMAGE FORMING APPARATUS, IMAGE FORMING METHOD, AND NON-TRANSITORY COMPUTER READABLE MEDIUM

(71) Applicant: FUJI XEROX CO., LTD., Tokyo (JP)

(72) Inventors: Takeshi Furuya, Kanagawa (JP); Chigusa Nakata, Kanagawa (JP); Hiroshi Honda, Kanagawa (JP); Eiji Nishi, Kanagawa (JP); Yoshihiro Sekine, Kanagawa (JP); Kenji Kuroishi, Kanagawa (JP); Hiroshi Mikuriya, Kanagawa (JP); Ryuichi Ishizuka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/473,740

(22) Filed: Mar. 30, 2017

(65) Prior Publication Data

US 2018/0067699 A1 Mar. 8, 2018

(30) Foreign Application Priority Data

Sep. 2, 2016 (JP) ................. 2016-171648

(51) Int. Cl.
*G06F 3/12* (2006.01)
*H04N 1/00* (2006.01)
*H04L 29/08* (2006.01)

(52) U.S. Cl.
CPC .......... *G06F 3/1204* (2013.01); *G06F 3/1236* (2013.01); *G06F 3/1237* (2013.01); *G06F 3/1286* (2013.01); *H04N 1/00013* (2013.01); *H04L 67/10* (2013.01)

(58) Field of Classification Search
CPC .................................................. G06F 3/1204
USPC ......................................................... 358/1.13
See application file for complete search history.

(56) References Cited

U.S. PATENT DOCUMENTS

2016/0337453 A1* 11/2016 Lee ........................... G06F 8/38
2017/0068969 A1* 3/2017 Arai ....................... G06Q 30/06

FOREIGN PATENT DOCUMENTS

JP 2002-330213 A 11/2002
JP 2007-257124 A 10/2007

* cited by examiner

*Primary Examiner* — Jacky Zheng
(74) *Attorney, Agent, or Firm* — Sughrue Mion, PLLC

(57) ABSTRACT

Provided is an image forming apparatus including
a reading unit that reads information from a recording medium on which information on a situation grasping device is written,
an acquiring unit that acquires specific information for specifying the situation grasping device from the information read by the reading unit, and
a setting unit that sets association with the situation grasping device using the specific information acquired by the acquiring unit.

13 Claims, 6 Drawing Sheets

*FIG.5A*

MANAGEMENT TABLE

| No. (MANAGEMENT NUMBER) | SERIAL NUMBER | POSITION ON NETWORK (IP ADDRESS) | TYPE OF DEVICE |
|---|---|---|---|
| 1 | aaabb1 | | |
| 2 | aaabb2 | | |
| 3 | ddee | | |
| 4 | fg | | |

*FIG.5B*

MANAGEMENT TABLE

| No. (MANAGEMENT NUMBER) | SERIAL NUMBER | POSITION ON NETWORK (IP ADDRESS) | TYPE OF DEVICE |
|---|---|---|---|
| 1 | aaabb1 | 192.168.0.10 | light |
| 2 | aaabb2 | 192.168.0.11 | air conditioner |
| 3 | ddee | 192.168.0.12 | temperature sensor |
| 4 | fg | 192.168.0.13 | humidity sensor |

FIG.6

REPORT

OUTPUT DATE AND TIME: OO XX, 2016 21:38:05

| MANAGEMENT NUMBER | SERIAL NUMBER | POSITION ON NETWORK | TYPE OF DEVICE |
|---|---|---|---|
| No.1 | aaabb1 | 192.168.0.10 | light |
| No.2 | aaabb2 | 192.168.0.11 | air conditioner |
| No.3 | ddee | 192.168.0.12 | temperature sensor |
| No.4 | fg | 192.168.0.13 | humidity sensor |

EOF

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-171648 filed Sep. 2, 2016.

BACKGROUND

Technical Field

The present invention relates to an image forming apparatus, an image forming method, and a non-transitory computer readable medium.

SUMMARY

According to an aspect of the invention, there is provided an image forming apparatus including:
a reading unit that reads information from a recording medium on which information on a situation grasping device is written;
an acquiring unit that acquires specific information for specifying the situation grasping device from the information read by the reading unit; and
a setting unit that sets association with the situation grasping device using the specific information acquired by the acquiring unit.

BRIEF DESCRIPTION OF THE DRAWINGS

Exemplary embodiments of the present invention will be described in detail based on the following figures, wherein:

FIGS. 5A and 5B are views for explaining an example of a management table stored in a memory in which FIG. 5A illustrates a case when a serial number acquired by an image processing unit is accepted, and FIG. 5B illustrates a case when additional information is accepted from a state illustrated in FIG. 5A; and FIG. 6 is a view illustrating an example of a report which is output on a recording material by an image forming apparatus.

DETAILED DESCRIPTION

Hereinafter, an exemplary embodiment of the present invention will be described in detail with reference to the accompanying drawings.

Figure 1:
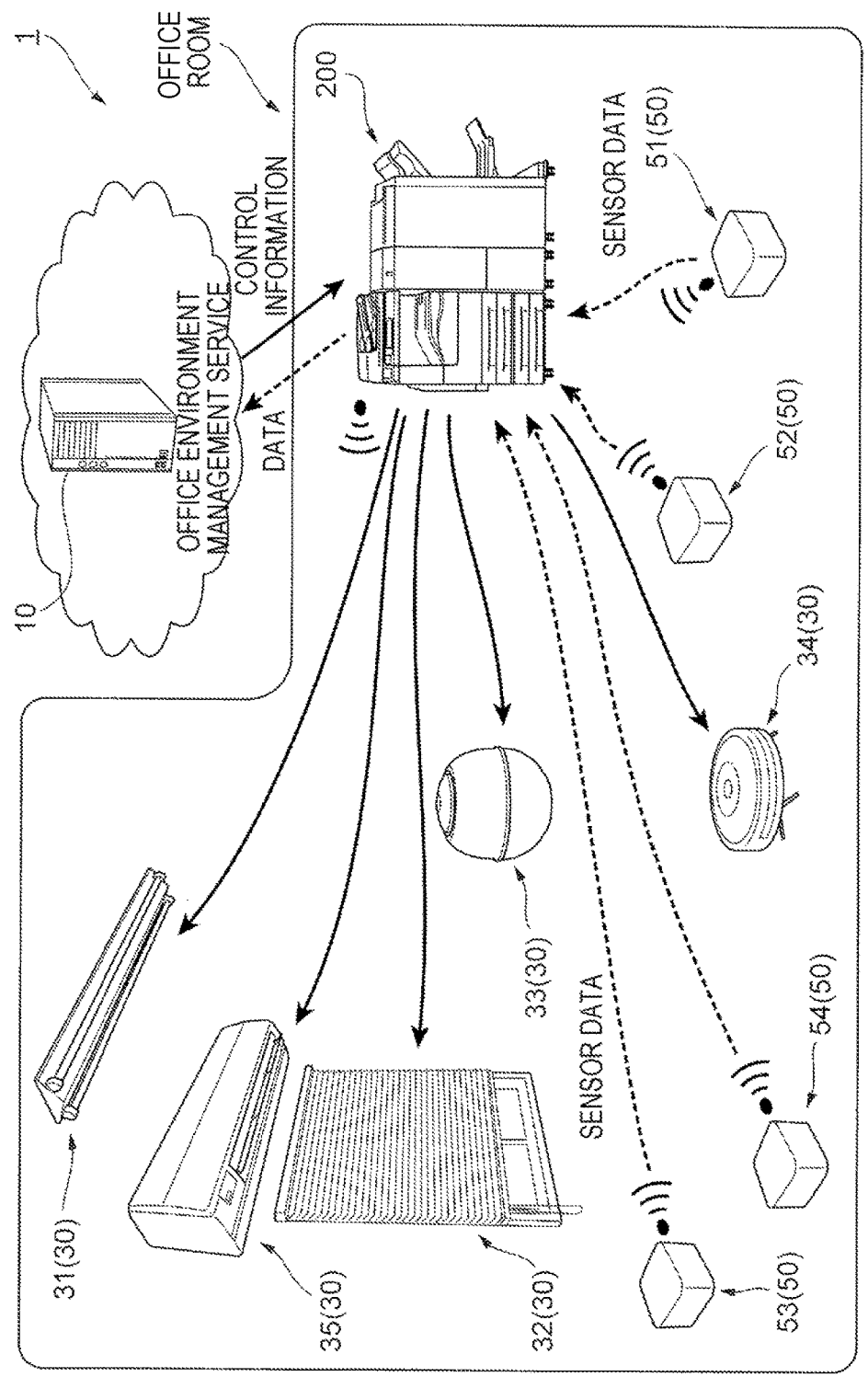
FIG. 1 is a view illustrating an entire configuration of an office environment management system.

FIG. 1 is a view illustrating an entire configuration of an office environment management system 1.

An office environment management system 1 illustrated in FIG. 1 includes a management server 10 as an example of a management device provided on a cloud and an image forming apparatus 200 that is connected to the management server 10 to perform a function as a gateway or an edge server.

The image forming apparatus 200 is provided in an office room (or in an office) where a user works. Further, the image forming apparatus 200 has a facsimile function or a scanner function in addition to an image forming function.

The office environment management system 1 further includes plural controlled devices 30 that are connected to the management server 10 through the image forming apparatus 200 and controlled by control information output from the management server 10. Further, the office environment management system 1 according to the exemplary embodiment includes plural situation grasping devices 50 that is provided in the office room and grasps a situation around the situation grasping devices.

The controlled device 30 and the situation grasping device 50 are devices to be connected that are connected to the management server 10 by communication. The controlled device 30 and the situation grasping device 50 may be uniquely identified by the management server 10 and the controlled device 30 may exchange information.

More specifically, the controlled device 30 and the situation grasping device 50 are connected to the Internet and devices or terminal devices used for Internet of Things (IoT). The controlled device 30 and the situation grasping device 50 are examples of the IoT device.

The controlled device 30 communicates with the image forming apparatus 200 and receives a control signal from the image forming apparatus 200. In the exemplary embodiment, as the controlled device 30, a lighting device 31, a blind device 32, a humidifier 33, a cleaning device 34, and an air conditioner 35 are provided.

The lighting device 31 has a light source and turns on or off the light source in accordance with a control signal from the management server 10.

The blind device 32 has a blind and a driving mechanism that changes a state of the blind and changes the state of the blind in accordance with the control signal from the management server 10. By doing this, an amount of external light which enters the office room is changed.

The humidifier 33 has a mechanism that evaporates water and performs humidification in the office room in accordance with the control signal from the management server 10.

The cleaning device 34 has a suction mechanism that sucks trash in the office and moves in the office room to collect the trash in the office room in accordance with the control signal from the management server 10.

The air conditioner 35 has a heating source and controls air conditioning in the office in accordance with the control signal from the management server 10.

In the exemplary embodiment, as the situation grasping device 50, various sensors are provided.

Specifically, in the exemplary embodiment, a temperature sensor 51 that measures a temperature, a humidity sensor 52 that measures humidity, and an illuminance sensor 53 that measures illuminance are provided. Further, a person sensor 54 that includes an infrared sensor or the like and detects a person in the office room is provided.

In the meantime, in the exemplary embodiment, an example in which a sensor is provided as the situation grasping device 50 has been described, but as the situation grasping device 50, a surveillance camera may also be provided in addition thereto.

Each of the situation grasping devices 50 transmits the acquired information (hereinafter, also referred to as "situation information" in some cases) to the image forming apparatus 200 using wireless communication or wired communication (by communicating with the image forming apparatus 200). The image forming apparatus 200 transmits the situation information from the situation grasping device 50 to the management server 10 (a server of a service company which provides an office environment management service).

In the office environment management system 1, control information which is used to control the controlled device 30 is transmitted from the management server 10 to the image forming apparatus 200. The image forming apparatus 200 transmits the control information to a corresponding controlled device 30.

Figure 2:
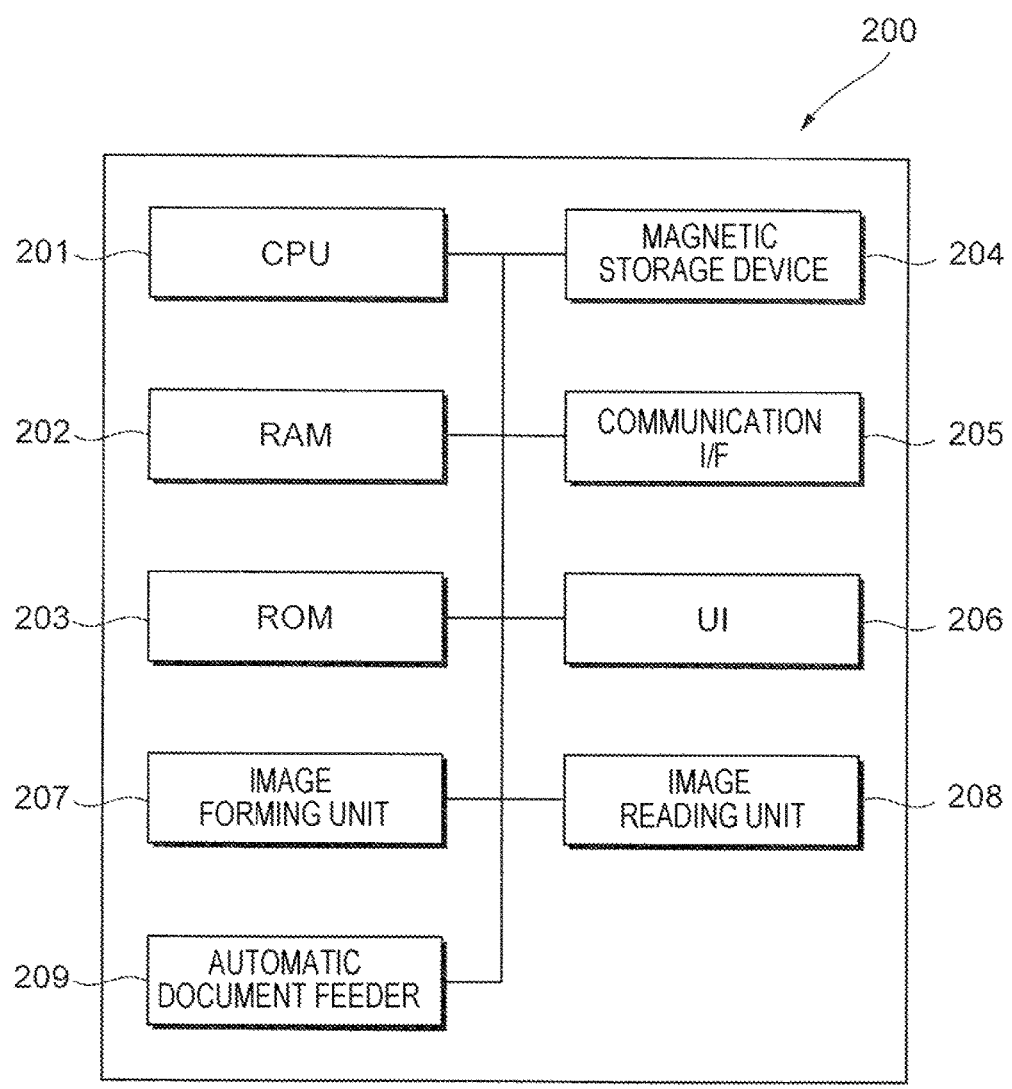
FIG. 2 is a view illustrating a hardware configuration of an image forming apparatus.

FIG. 2 is a view illustrating a hardware configuration of the image forming apparatus 200.

As illustrated in FIG. 2, the image forming apparatus 200 includes a central processing unit (CPU) 201, a random access memory (RAM) 202, a read only memory (ROM) 203, and a magnetic storage device 204. The image forming apparatus 200 further includes a communication interface (communication I/F) 205 to perform communication with the outside.

The image forming apparatus 200 further includes a UI 206 and an image forming unit 207.

The UI 206 includes, for example, a touch panel type display and displays information to the user and accepts manipulation from the user.

The image forming unit 207 that is an example of an image forming part forms an image on a sheet which is an example of a recording material using an electrophotographic system or an inkjet head method.

The image forming apparatus 200 includes an image reading unit 208 as an example of a reading part and an automatic document feeder 209.

The image reading unit 208 includes a so-called scanner device and optically reads an image of a set document in a reading position to generate a read-out image (image data). In the meantime, it is also considered that the image reading unit 208 includes a camera device.

The automatic document feeder 209 transports the document to the reading position of the image reading unit 208.

The ROM 203 and the magnetic storage device 204 store a program executed by the CPU 201. The CPU 201 reads out a program which is stored in the ROM 203 or the magnetic storage device 204 and executes the program with the RAM 202 as a working area.

Each functional unit which will be described below is implemented by executing the program stored in the ROM 203 or the magnetic storage device 204 by the CPU 201.

Here, the program which is executed by the CPU 201 may be stored in a computer readable recording medium such as a magnetic recording medium (a magnetic tape or a magnetic disk), an optical recording medium (an optical disc), a magnetooptic recording medium, or a semiconductor memory to be provided to the image forming apparatus 200. Further, the program which is executed by the CPU 201 may be downloaded in the image forming apparatus 200 using a communication unit such as the Internet.

Figure 3:
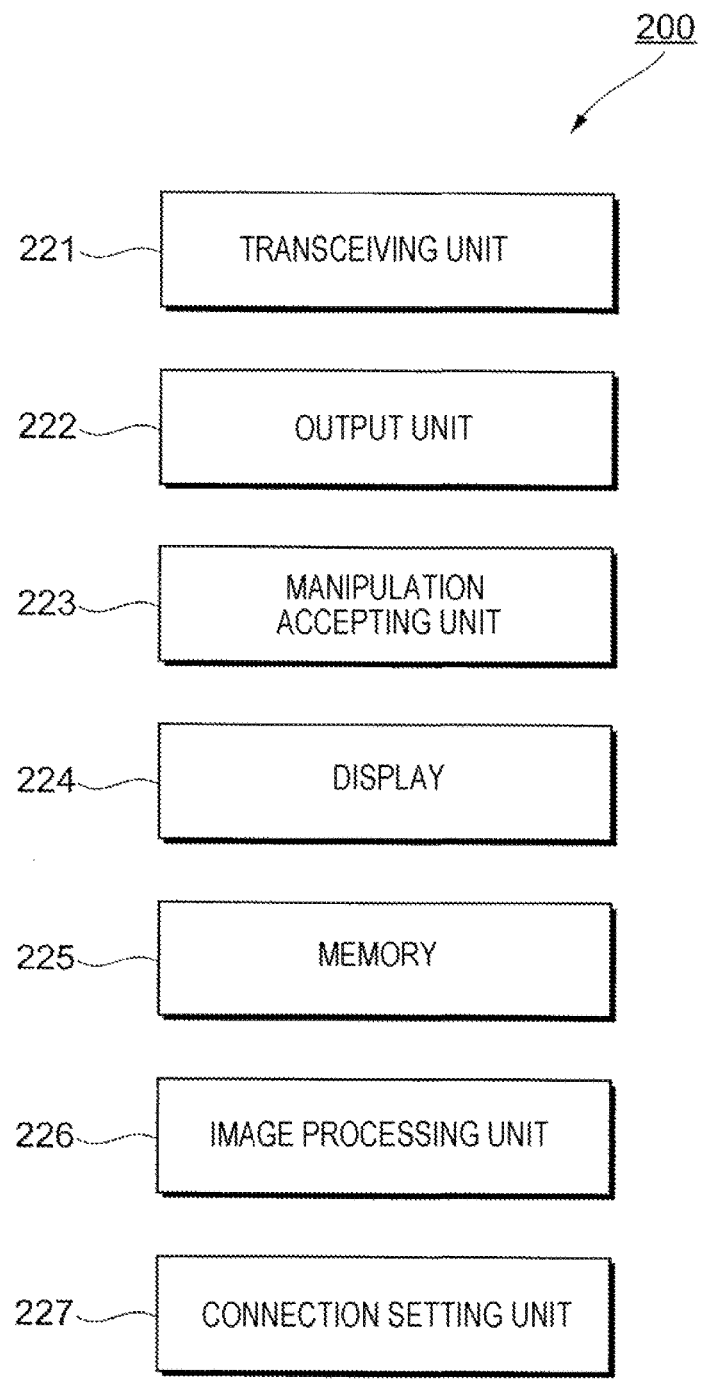
FIG. 3 is a view illustrating each functional unit implemented by a CPU of an image forming apparatus.

FIG. 3 is a view illustrating each functional unit implemented by the CPU 201 of the image forming apparatus 200.

In the image forming apparatus 200 according to the exemplary embodiment, as illustrated in FIG. 3, a transceiving unit 221 is provided as an example of an acquiring unit. The transceiving unit 221 is implemented by the CPU 201 that executes a program related to the reception/transmission of information and the communication I/F 205.

The transceiving unit 221 receives control information from the management server 10. Further, the transceiving unit 221 transmits the received control information to the controlled device 30. Further, the transceiving unit 221 receives (acquires) information from the controlled device 30, from the controlled device 30. Further, the transceiving unit 221 transmits the information from the controlled device 30 to the management server 10.

Further, the transceiving unit 221 receives (acquires) information (information including the situation information) output from the situation grasping device 50, from the situation grasping device 50. Further, the transceiving unit 221 transmits the information received from the situation grasping device 50 to the management server 10.

As illustrated in FIG. 3, the image forming apparatus 200 includes an output unit 222.

The output unit 222, as an example of an output part, is implemented by the CPU 201 that executes a program related to the output.

The output unit 222 outputs information on the controlled device 30 acquired by the transceiving unit 221 or information on the situation grasping device 50 acquired by the transceiving unit 221. Further, the output unit 222 outputs not only the information on the controlled device 30 and the situation grasping device 50, but also information on the management server 10.

Specifically, the output unit 222 displays information on a display 224, prints out the information on a sheet using the image forming unit 207 (see FIG. 2), or transmits the information through e-mail.

The image forming apparatus 200 further includes an operation accepting unit 223, the display 224, and a memory 225.

The operation accepting unit 223 is implemented by the CPU 201 (see FIG. 2) that executes a program related to the manipulation accepting and the UI 206. The operation accepting unit 223 accepts information which is input by the user in the office room.

The display 224 includes the UI 206 (see FIG. 2) and displays information to the user in the office room.

The memory 225 includes a magnetic storage device 204 or the like (see FIG. 2) and stores information and data.

As illustrated in FIG. 3, the image forming apparatus 200 includes an image processing unit 226 as an example of an acquiring unit and a connection setting unit 227 as an example of a setting part.

The image processing unit 226 performs image processing, for example, optical character recognition processing on the image read by the image reading unit 208 to acquire data such as a serial number. The data acquired as described above is stored in the above-described memory 225. Further, the transceiving unit 221 acquires specific information for specifying the controlled device 30 or the situation grasping device 50, based on the data. The specific information may be acquired, for example, by the management server 10 and also is considered to be acquired by another server. As described above, in the exemplary embodiment, the specific information may be acquired by the image processing unit 226 and the transceiving unit 221.

The connection setting unit 227 sets association with the controlled device 30 or the situation grasping device 50 using data acquired by the image processing unit 226. More specifically, the connection setting unit 227 creates a management table (see FIG. 5B) which will be described below and stores the created management table in the memory 225.

Next, a scene for registering the controlled device 30 or the situation grasping device 50 in the image forming apparatus 200 in order to implement the office environment management service illustrated in FIG. 1 will be described. The registration to the image forming apparatus 200 in the exemplary embodiment is performed by reading contents written in the document corresponding to the controlled device 30 or the situation grasping device 50 to be registered by the image reading unit 208 (for example, see FIG. 2) of the image forming apparatus 200.

More specifically, the document described herein refers to, for example, a product catalog or an instruction manual, an accommodating box for accommodating products, and also includes an enveloped sheet enveloped in the accommodating box and a seal attached on the product catalog. Further, as a document, a sheet which is separately prepared instead of an attached sheet attached at the time of purchase of a product is also considered.

In this document, a document image including identification information which is information for uniquely specifying the controlled device 30 or the situation grasping device 50 is displayed. Examples of the identification information include object identification information such as a serial number or an MAC address.

The document image of the document is read by the image reading unit 208 of the image forming apparatus 200 so that the image forming apparatus 200 acquires the identification information of the controlled device 30 or the situation grasping device 50 to be registered, which will be described below.

Figure 4:
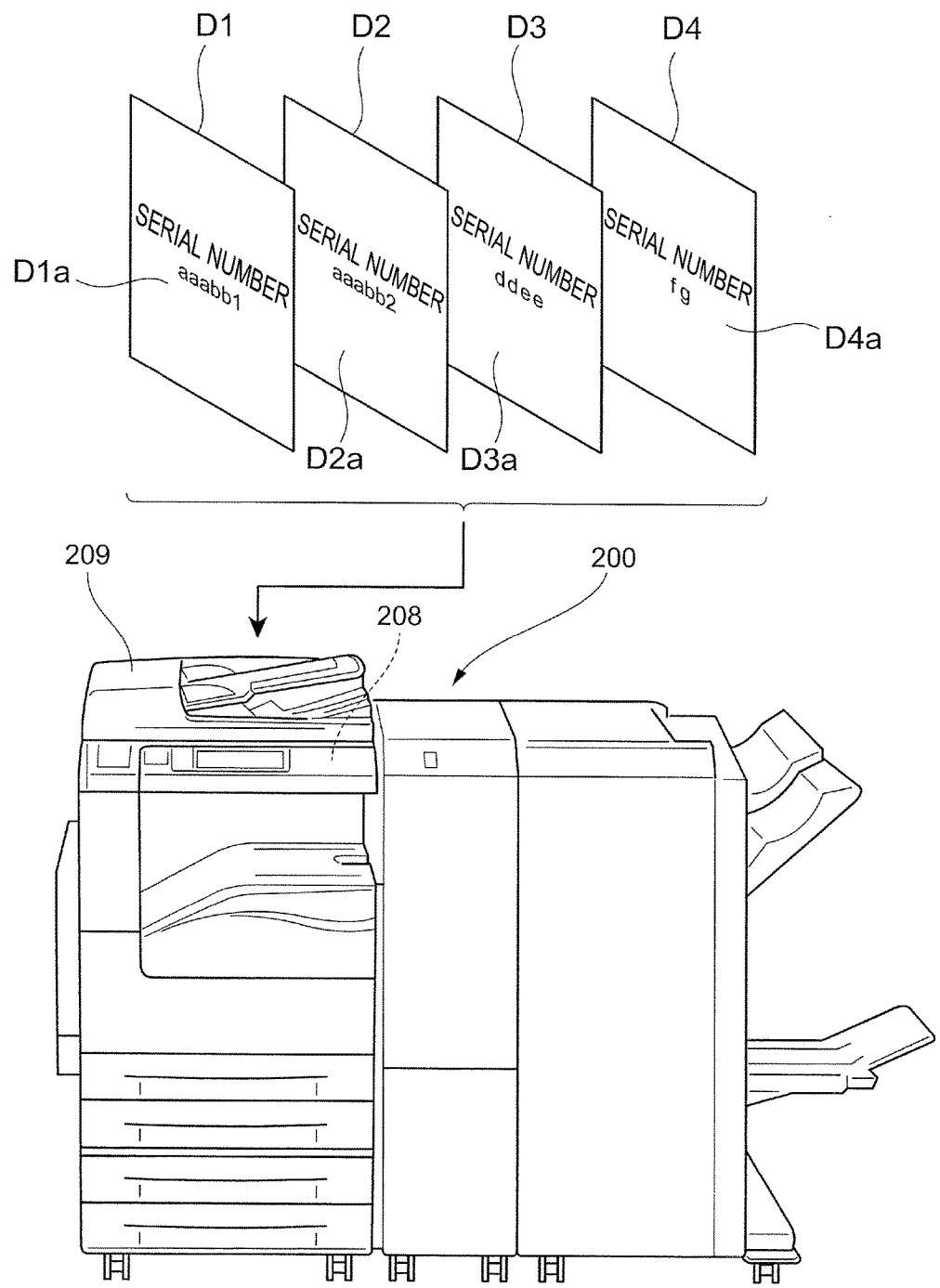
FIG. 4 is a view for explaining a case when information written on a document is read.

FIG. 4 is a view for explaining a case when information written on documents D1, D2, D3, and D4 is read. The documents D1 to D4 are examples of a recording medium.

The documents D1 to D4 illustrated in FIG. 4 correspond to any one of the controlled device 30 and the situation grasping device 50. In the exemplary embodiment, it is described that the documents D1 to D4 are the enveloped sheets enveloped in the accommodating box, but the documents D1 to D4 may be other type of documents.

In the exemplary embodiment, the document D1 corresponds to the lighting device 31 (see FIG. 1) and the document D2 corresponds to the air conditioner 35 (see FIG. 1). Further, the document D3 corresponds to the temperature sensor 51 (see FIG. 1) and the document D4 corresponds to the humidity sensor 52 (see FIG. 1). In the meantime, the same processing may be performed also on another controlled device 30 and situation grasping device 50.

In the document D1, a document image D1a including a serial number "aaabb1" which is identification information of the lighting device 31 is written. In the document D2, a document image D2a including a serial number "aaabb1" which is identification information of the air conditioner 35 is written.

Further, in the document D3, a document image D3a including a serial number "ddee" which is identification information of the temperature sensor 51 is written and in the document D4, a document image D4a including a serial number "fg" which is identification information of the humidity sensor 52 is written.

In the meantime, in the exemplary embodiment, it is described that character information is included in the document images D1a to D4a as the identification information, but the present invention is not limited thereto. It is also considered to use image information, for example, a barcode (for example, a QR code (registered trademark) as a two-dimensional barcode) as identification information.

In the exemplary embodiment, when the document images D1a to D4a in the documents D1 to D4 are read by the image reading unit 208, the automatic document feeder 209 is used. That is, the documents D1 to D4 of the enveloped sheet to be registered are set in the automatic document feeder 209, so that the documents D1 to D4 are sequentially transported in the reading position by the automatic document feeder 209. As a result, the document images D1a to D4a are read by the image reading unit 208.

The image processing is performed on the document images D1a to D4a which are read as described above, by the image processing unit 226 (see FIG. 3). By doing this, the image forming apparatus 200 acquires data of the serial number "aaabb1" included in the document image D1a. Similarly, the image forming apparatus 200 acquires data of the serial number "aaabb2" included in the document image D2a, the serial number "ddee" included in the document image D3a, and the serial number "fg" included in the document image D4a. The acquired data is stored in the memory 225 (see FIG. 3).

In the meantime, it has been described that the image reading unit 208 is a scanner device, but the image reading unit 208 may be a camera device, as described above and in that case, the data is acquired from the captured image. In other words, since the data is acquired from the image as described above, regardless of the type of data, characters are included in addition to symbols and numbers. In that case, registration is not limited to mother tongue, but may be allowed for non-native language data.

As described above, the image reading unit 208 (see FIG. 2 or 4) and the image processing unit 226 (see FIG. 3) may improve workability for collectively inputting the serial numbers of the controlled device 30 or the situation grasping device 50 to be registered. Further, in that case, a working load may be reduced by using the automatic document feeder 209.

In the meantime, even though it is preferable to omit a character inputting operation by an operator from the viewpoint of improving workability, it is also considered that the operator performs the character inputting operation to supplement the registration by the image reading unit 208 and the image processing unit 226.

FIGS. 5A and 5B are views for explaining an example of a management table stored in the memory 225 in which FIG. 5A illustrates a case when a serial number acquired by the image processing unit 226 is accepted, and FIG. 5B illustrates a case when additional information is accepted from a state illustrated in FIG. 5A.

In the management table illustrated in FIG. 5A, management numbers and serial numbers are stored. The management numbers are assigned in the order of acquiring the serial numbers by the image processing unit 226.

In the meantime, in the management table of FIG. 5A, a position on the network and the type of device have not been stored yet.

In contrast, in the management table illustrated in FIG. 5B, not only the serial numbers, but also the position (IP address) on the network and the type of device are stored. That is, as described above, the transceiving unit 221 acquires the position on the network and the type of device based on the serial number and the connection setting unit 227 stores the position on the network and the type of device in the management table.

More specifically, in the exemplary embodiment, a position on the network of the serial number "aaabb1" is "192.168.0.10" and the type of device is "light." A position on the network of the serial number "aaabb1" is "192.168.0.11" and the type of device is an "air conditioner."

A position on the network of the serial number "ddee" is "192.168.0.12" and the type of device is a "temperature sensor" and a position on the network of the serial number "fg" is "192.168.0.13" and the type of device is a "humidity sensor."

Information on "position on the network" and information on "type of device" are acquired from the management server 10 based on the serial number. That is, the management server 10 recognizes the terminal device that is connected to the office environment management service in advance and returns information (for example, position information on the network) corresponding to the serial number in accordance with a request from the transceiving unit 221 (see FIG. 3) of the image forming apparatus 200 using the serial number.

In the image forming apparatus 200, the connecting setting unit 227 stores information from the management server 10 that is received by the transceiving unit 221 in the management table to store the information in the memory 225. By doing this, the controlled device 30 and the situation grasping device 50 are connected to the image forming apparatus 200. By doing this, in the image forming apparatus 200, the position of the controlled device 30 and the situation grasping device 50 on the network may be simply set.

In the meantime, information which is stored in the management table is not limited thereto, but it is also considered to store another information, for example, physical information (a position of the controlled device 30 and the situation grasping device 50 in the office). That is, the management server 10 returns physical position information corresponding to the serial number in accordance with a request from the transceiving unit 221 (see FIG. 3) of the image forming apparatus 200 using the serial number. Further, in the image forming apparatus 200, the connecting setting unit 227 stores the physical position information from the management server 10 which is received by the transceiving unit 221 in the management table to store the information in the memory 225. By doing this, in the image forming apparatus 200, the physical position of the controlled device 30 and the situation grasping device 50 may be simply set.

As described above, there is an example in which position information on the network is included as information which is transmitted from the management server 10 to be stored in the management table or an example in which physical position information is further included in addition to the position information on the network. However, an example in which the position information on the network is not included, but the physical position information is included is also considered.

An example in which information of "type of device" is not stored as information to be stored in the management table is also considered.

Next, a case when contents of the management table stored in the memory 225 are output as a report will be described. The outputting of a report is printed on the recording material P (see FIG. 6) by the output unit 222 (see FIG. 3) of the image forming apparatus 200. However, in addition to the case when the printing onto the recording material P is performed in accordance with the request to the image forming apparatus 200, it is also considered to perform the printing onto the recording material P when the management table (see FIG. 5A or 5B) stored in the memory 225 is created.

FIG. 6 is a view illustrating an example of a report which is output on a recording material P by the image forming apparatus 200.

On the recording material P illustrated in FIG. 6, contents of the above-described management table (see FIG. 5B) are also printed. That is, a connection result is output as a report. Specifically, output date and time are printed and the management number, the serial number, the position on the network, and the type of device in the management table are printed.

In the meantime, the present invention has been described using the exemplary embodiment, but a technical scope of the present invention is not limited to the above-described exemplary embodiment. It is obvious to those skilled in the art that various modifications or substituted aspects may be adopted without departing from the spirit and scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a scanner configured to scan information from a document on which information on a situation grasping device is written;
    a printer configured to form an image on a recording material; and
    a processor configured to execute:
        an acquiring unit configured to acquire specific information for specifying the situation grasping device from the information read by the scanner; and
        a setting unit configured to set association with the situation grasping device using the specific information acquired by the acquiring unit,
    wherein the image forming apparatus is configured as a gateway for management of the situation grasping device.

2. The image forming apparatus according to claim 1, wherein
    the setting unit is configured to transmit the specific information to a management device and receive position information of the situation grasping device from the management device.

3. The image forming apparatus according to claim 2, wherein
    the position information on the situation grasping device is at least one of position information on a network and physical position information.

4. The image forming apparatus according to claim 1, wherein the printer is configured to form contents of setting performed by the setting unit on the recording material as the image.

5. The image forming apparatus according to claim 1, wherein the information on the situation grasping device comprises a serial number identifying the situation grasping device.

6. The image forming apparatus according to claim 5, wherein the situation grasping device comprises one of a lighting device, a blind device, a humidifier, a cleaning device, an air conditioner, a temperature sensor, a humidity sensor, an illuminance sensor, and a person sensor.

7. The image forming apparatus according to claim 1, wherein the document comprises a product catalog, an instruction manual, an accommodating box configured to accommodate the situation grasping device, an enveloped sheet enveloped in the accommodating box, or a seal attached to the product catalog.

8. The image forming apparatus according to claim 7, wherein the document comprises a product catalog, an instruction manual, an accommodating box configured to accommodate the situation grasping device, an enveloped sheet enveloped in the accommodating box, or a seal attached to the product catalog.

9. The image forming apparatus according to claim 8, wherein the situation grasping device comprises one of a lighting device, a blind device, a humidifier, a cleaning device, an air conditioner, a temperature sensor, a humidity sensor, an illuminance sensor, and a person sensor.

10. The image forming apparatus according to claim 7, wherein the situation grasping device comprises one of a lighting device, a blind device, a humidifier, a cleaning device, an air conditioner, a temperature sensor, a humidity sensor, an illuminance sensor, and a person sensor.

11. The image forming apparatus according to claim 1, wherein the situation grasping device comprises one of a lighting device, a blind device, a humidifier, a cleaning device, an air conditioner, a temperature sensor, a humidity sensor, an illuminance sensor, and a person sensor.

12. An image forming method comprising:
   acquiring specific information for specifying a situation grasping device from information of the situation grasping device that is scanned by a scanner of an image forming apparatus from a document on which the information is written, the image forming apparatus including a printer configured to form an image on a recording material and being configured as a gateway for management of the situation grasping device; and
   setting association with the situation grasping device using the acquired specific information.

13. A non-transitory computer readable medium storing a program causing a computer of an image forming apparatus including a scanner configured to scan information from a document on which information of a situation grasping device is written to execute a process, the image forming apparatus further including a printer configured to form an image on a recording material and being configured as a gateway for management of the situation grasping device, the process comprising:
   acquiring specific information for specifying the situation grasping device from the information scanned by the scanner; and
   setting association with the situation grasping device using the acquired specific information.

\* \* \* \* \*